United States Patent [19]
Beusch

[11] 3,910,060

[45] Oct. 7, 1975

[54] CONTINUOUSLY OPERATING ICE MAKING APPARATUS

[76] Inventor: Christian Beusch, Zollstrasse, FL-9494 Schaan, Liechtenstein

[22] Filed: June 3, 1974

[21] Appl. No.: 475,437

[30] Foreign Application Priority Data
June 20, 1973 Switzerland.................. 008985/73

[52] U.S. Cl.................................. 62/188; 62/354
[51] Int. Cl.² ........................................ F25C 1/14
[58] Field of Search ............ 62/354, 348, 320, 188

[56] References Cited
UNITED STATES PATENTS
3,354,666  11/1967  Beusch et al. ...................... 62/354
3,403,526  10/1968  Brindley............................ 62/354 X Primary Examiner—William E. Wayner
Attorney, Agent, or Firm—W. G. Fasse; W. W. Roberts

[57] ABSTRACT

In the present ice making apparatus a screw type extruder advances the slush toward an apertured extrusion plate. The extruder axle extends with its upper end through the extrusion plate. Air vents, for example, in the form of a ring gap between the extruder axle and the extrusion plate, are provided for venting the space below the extrusion plate. A water circulation circuit including a water space adjacent to said vent or vents provides for a heat exchange between the circulating water and the apparatus element adjacent to said vent or vents, whereby an ice formation in said vent or vents and thus their clogging is prevented.

11 Claims, 2 Drawing Figures

CONTINUOUSLY OPERATING ICE MAKING APPARATUS

BACKGROUND OF THE INVENTION

This invention relates to a continuously operating ice making apparatus having a housing including a cooling jacket and pressure means inside the housing, for example, in the form of a screw type extruder for extruding ice through an apertured extrusion plate secured in said housing preferably at the upper end thereof. Venting means are located between the upper end of the extruder screw and the apertured extrusion plate or rather between the upper axle of the extruder screw and the apertured extrusion plate.

U.S. Pat. No. 3,354,666 granted to Christian Beusch et al. on Nov. 28, 1967 describes a continuous ice making apparatus of the above type. Such apparatus is capable of producing compressed, crushed ice having a grain size smaller than about two cubic centimeters.

In the known ice making machines of this type the screw type extruder scrapes off the slush being continuously formed on the inside surface of the cooling jacket, thereby transporting and compressing the slush toward an extrusion plate arranged at the upper end of the extruder screw and provided with conical apertures. In pressing the slush ice mixture through these conical apertures the ice is densified, whereby ice of a desired compactness is formed. The hardness of the produced ice granules may be varied by selecting a respective angle which determines the conical aperture in the extrusion plate and the selection will again depend upon the type of use for which the ice granules are intended.

During the compacting of the ice slush to form the ice, air is removed from the slush, whereby an air cushion is formed at the upper end of the extruder screw underneath the extrusion plate. Such air cushion may gradually impede the water supply into the ice making apparatus because the pressure developed by the air cushion may travel downwardly in the ice making apparatus. Therefore, it is necessary to provide an effective venting of the area underneath the extrusion plate in order to prevent the formation of such air cushions.

U.S. Pat. No. 3,354,666 mentioned above, discloses a venting means located at the upper end of the axle of the extruder screw. However, it has been found that such venting means tend to be clogged by the formation of ice which may occur even after a short duration of operation. This is undesirable especially where a continuous operation is intended.

OBJECTS OF THE INVENTION

In view of the above, it is the aim of the invention to achieve the following objects singly or in combination:

to provide a venting means in an apparatus of the above described type which may be effectively kept open by preventing any ice formation;

to provide means adjacent to the venting channels which will assure a continuous heat exchange between the apparatus elements surrounding the venting channels and a flowing medium, such as water, the temperature of which may be kept above the freezing point; and to integrate the heat exchange means into the existing structure of a continuously operating ice making machine in such a manner that the cost of the machine is not substantially increased.

SUMMARY OF THE INVENTION

According to the invention there is provided an apparatus for the continuous production of ice, especially granular ice having a housing including a cooling jacket and pressure means located inside the cooling jacket which is also connected to water supply means and which is provided with an apertured extrusion plate, wherein venting means are arranged adjacent to the extrusion plate and wherein heat exchange means are located as close as possible to the venting means so as to prevent the ice formation in these venting means. Preferably, the pressure means comprise an extruder screw which reaches with its upper axle end through the extrusion plate thereby leaving a ring gap between the surface of the extruder screw axle and the extrusion plate, whereby a water circulation space is arranged in such a position above and preferably also around the extrusion plate that the venting means will continuously be in contact with the circulating water.

The invention has the advantage that very simple means reliably prevent the clogging of the venting channels at the upper end of the extruder screw even where the apparatus operates continuously. The circulating water prevents the ice formation and in addition the heat exchange provided by the circulating water also prevents the clogging of the upper turns of the extruder screw, since the heat exchange prevents ice pieces from freezing onto the surfaces of the upper turns of the extruder screw.

BRIEF FIGURE DESCRIPTION

In order that the invention may be clearly understood, it will now be described by way of example, with reference to the accompanying drawings, wherein:

FIG. 1 is a vertical section through an ice making apparatus modified in accordance with the present invention; and FIG. 2 illustrates a section similar to that of FIG. 1 but showing a different embodiment of the invention.

DETAILED DESCRIPTION OF EXAMPLE EMBODIMENTS

Figure 1:
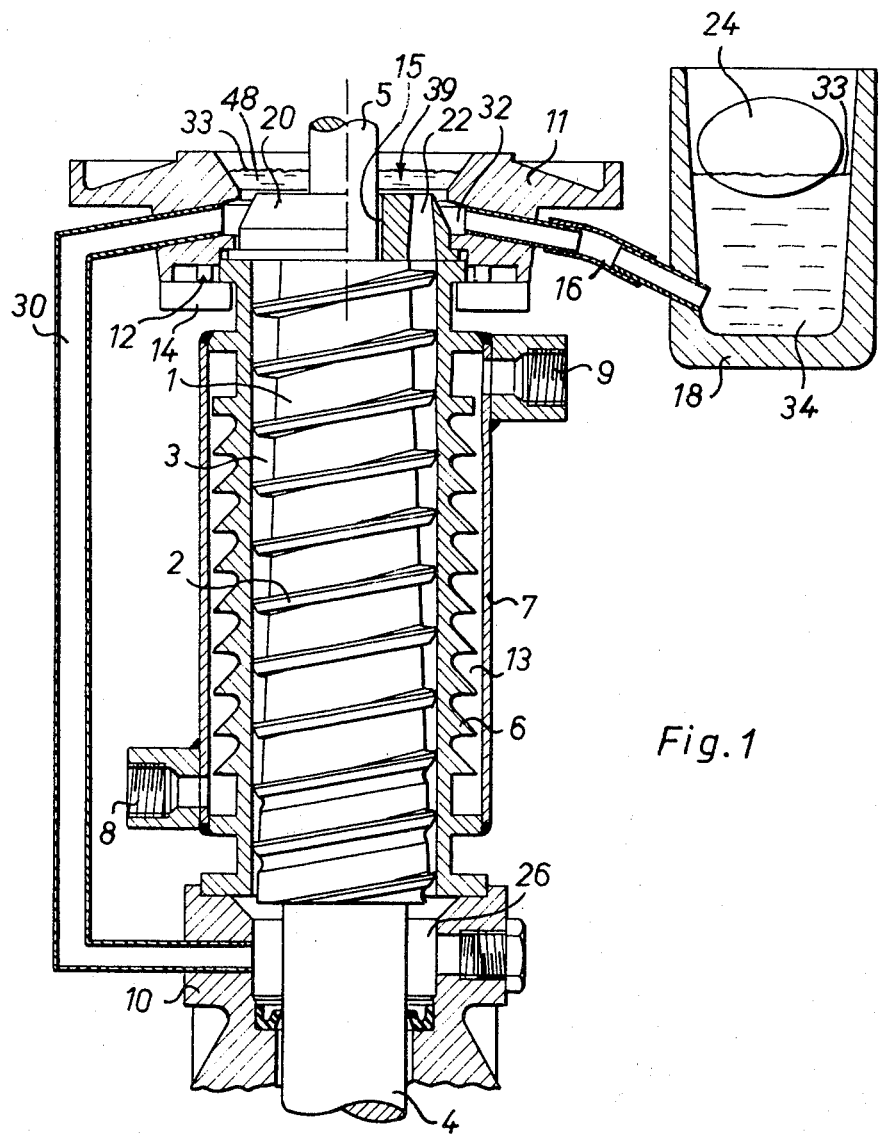
Figure 2:
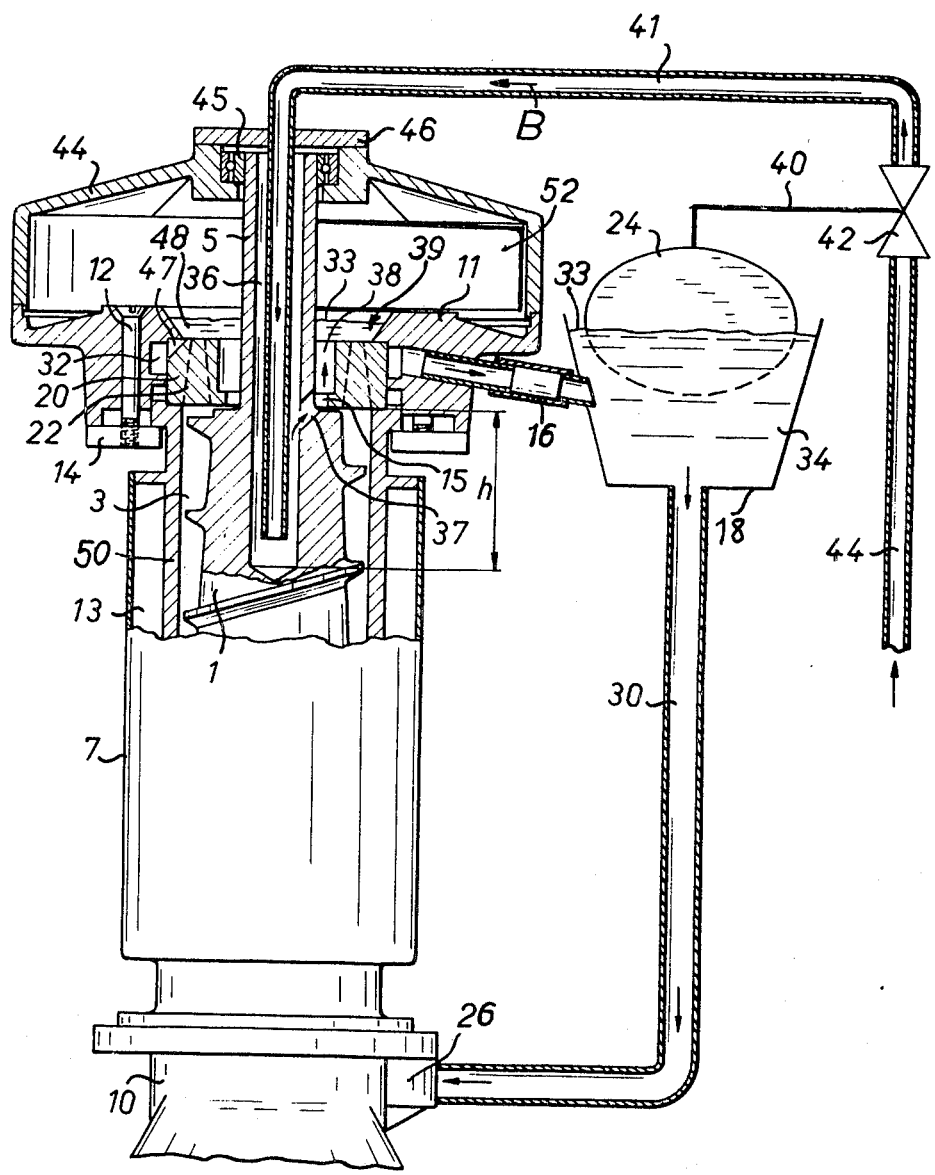

The apparatus for continuously producing ice, especially granular ice shown in FIG. 1 comprises a conveyor screw 1 operating as an extruder screw rotating about an axis extending substantially vertically and provided with screw turns 2. The free space 3 between adjacent screw turns, in other words the pitch of the screw increases from the lower end toward its upper end. The lower axle end 4 of the screw is rotatably supported in a base member 10 and connected to a drive motor not shown. The upper axle end 5 of the screw is also supported for rotation, for example, in the manner as shown in FIG. 2 to be described below. The drive motor rotates the screw 1 to transport the slush in an upward direction.

The conveyor or extruder screw 1 is surrounded by a cooling jacket comprising an inner wall member 6 and an outer housing wall 7. A cooling medium circulates in the space 13 between the jacket member 6 and the wall 7. The cooling medium is supplied to the space 13 through an inlet port 18 and removed through the outlet port 9 for proper circulation. The inlet and outlet ports 8 and 9 are connected in a known manner to a cooling means, for example, a cooling compresser or an absorption cooling device not shown. The cooling medium may, for instance, be "FREON" and the temperature of the inner jacket 6 is maintained preferably in a range of about −10° to −20°C.

An annular ring-shaped extrusion plate 20 is arranged at the upper end of the extruder screw 1. The plate 20 comprises a plurality of preferably conical apertures 22 distributed over its entire area. The angle of the cone of these apertures 22 determines the degree to which the ice is compressed. A ring flange 11 assures the centered location of the extrusion plate 20 relative to the rotational axis of the extruder screw 1. The ring flange 11 is secured to the housing structure by screws 12 and a clamping ring 14, whereby the plate 20 is properly held in its centered position. The extrusion plate 20 has a central aperture of a diameter slightly larger than the outer diameter of the upper axle end 5 of the screw, whereby a venting gap 15 is provided between the plate 20 and the axle end 5 which extends through said central aperture of the plate 20. As the screw rotates it scrapes off the slush which forms along the inner surfaces of the jacket member 13 and transports it towards and through the conical apertures 22 under pressure, whereby the ice is compacted. A scraper blade 52 (shown in FIG. 2) is secured for rotation to the axle end 5 and rides along with its edge on the upper surface of the plate 20, thereby scraping off the ice strands as they emerge from the apertures 22. The rotation of the scraper blade also moves the ice granules into a discharge chute or the like not shown but illustrated in the above mentioned U.S. Pat. No. 3,354,666.

During the compression of the ice slush through the apertures 22, air is pressed out of the slush which tends to form an air cushion around the upper end of the extruder screw 1 underneath the plate 20. This air cushion increases the pressure inside the housing, whereby the water supply into the housing is impeded or even prevented. In order to effectively remove the air from the space underneath the plate 20, the ring gap 15 acts as a vent. Other venting means may also be provided or may be arranged in the alternative. In other words, the invention is not limited to venting means in the form of a ring gap.

In order to prevent the ice formation and thus the clogging of the venting gap 15, there is provided according to the invention at least one heat exchange means in the form of a water circulation space 39 surrounding the top surface of the plate 20 and a portion of the length of the axle end 5. The water circulation space includes a ring space 32 surrounding at least the upper portion of the plate 20. The water circulation space 39 is open in the upward direction so that the water may flow into the space 48 above the plate 20 to form a liquid level 33, whereby as mentioned, the water also surrounds at least a portion of the axle 5. In other words, the water circulation or heat exchange space 39 comprises the ring space 32, the space above the plate 48 and the ring gap 15.

The circulating heat exchange water 34 is supplied from a supply container 18 for example through a hose and/or pipe 16 interconnecting the container 18 with the ring space 32. The heat exchange water 34 flows around the outer surface of the plate 20 and is supplied through a pipe 30 from the ring channel 32 into a water inlet space 26 at the bottom of the extruder screw 1. The water level 33, which due to said interconnection of the container 18 and the space 39 by the conduit 16 is the same in the container 18 and in the space 39, may be controlled by a float 24 in a manner known as such.

The water 34 flowing, for example, by gravity from the container 18 through the water circulation circuit just described and into the space 26 provides a heat exchange relative to the plate 20 so as to somewhat warm up the plate 20 as well as the upper end 5 of the screw 1, whereby the water is cooled and an ice formation is prevented at the upper end of the screw as well as in the venting ring gap 15. This water circulation and cooling of the water has the further advantage that the water is already at a temperature suitable for the freezing when it reaches the water supply space 26. As mentioned, the water is formed into a slush as the screw 1 advances the freezing water upwardly along the cold surfaces of the jacket 6, whereby the ice being formed along the inner surface of the jacket 6 is scraped off by the screw.

The water from the water circulating space 39 could also be discharged in some other manner. However, the use of said water as disclosed in the present invention has the above mentioned advantage of reducing thermal losses since the pre-cooling of the water is advantageous for the ice formation in an efficient manner.

Instead of employing a water circulation space 39 which is upwardly open, it would also be possible to provide a water circulating space inside the extrusion plate 20, such space would be closed or substantially closed.

FIG. 2 illustrates a modified embodiment according to the invention, whereby the same reference numerals have been employed as in FIG. 1 for the same elements. The water supply is accomplished in the embodiment of FIG. 2 by means of a vertically extending axial bore in the axle end 5 of the screw 1 at the upper end thereof. The length $h$ of this bore between the upper end of the screw 1 or between the lower facing surface of the plate 2 and the bottom of the bore 36 corresponds substantially to the inner diameter of the cooling jacket 50. A stationary water supply condiut 44 has a free end 41 which reaches into the bore 36 close to the bottom of the bore 36 but leaving a sufficient spacing for the water to flow into the bore 36. For this purpose the bore 36 has a larger diameter than the outer diameter of the water supply pipe end 41. A cross bore 37 interconnects the bore 36 and a ring space 38 provided in the plate 20.

A valve 42 is arranged in the water supply conduit 44 and is controlled by a float 24 which responds to the water level 33 in the water space 39 and in the water container 18. The cross bore 37 is arranged at about the lower facing surface of the plate 20, whereby the water may flow through the ring gap 15 into said ring channel 38 which in turn is connected with the water space 39, the latter being connected to the ring space 32 by means of passageways such as notches or grooves 47. Accordingly, the water circulation circuit comprises the space 39, the axial bore 36, the cross bore 37, the ring gap 15, the ring channel 38, the space 48 above the plate 20 and the ring space 32, as well as the conduit means 16 and the water container 18. The space 48 is open and the height of the water level 33 corresponds to that in the container 18 due to the interconnecting conduit means 16. The water 34 from the supply container 18 may also flow through the conduit 30 into the water inlet space 26 of the ice making apparatus as described with reference to FIG. 1. Here again, the cooling effect is advantageous.

The upper end 5 of the axle of the screw 1 is rotatably supported in a bearing 45 held in a upper housing hood closed by a cover member 46. The operation of the apparatus according to FIG. 2 corresponds substantially to that of FIG. 1. When the water level 33 in the container 18 is reduced due to using up of the water for the ice production, the float 24 will sink thereby opening the water supply valve 42 through suitable lever means 40, whereby the water will flow in the direction of the arrow B through the pipe 41, whereby it reaches the water space 39 through the passages described above. The water then flows from the outer ring space 32 through the conduit means 16 into the supply container 18, whereby the level 33 of the water 34 in the container 18 rises again to close the valve 42 upon reaching a predetermined level. Thus, the valve 42 will be opened and closed depending upon the quantity of water needed.

In the embodiment of FIG. 2 again a venting is accomplished through the ring gap 15 and the inner ring channel 38 upwardly of the air accumulating underneath the plate 20 during the ice formation. As a result, no air cushion can develop underneath the plate 20. Further, the circulating water in the water circulation circuit acting as a heat exchange means effectively prevents an ice formation in the area of the ring gap 15 and around the upper end of the extruder screw 1.

Although the invention has been described with reference to specific example embodiments, it is to be understood, that it is intended to cover all modifications and equivalents within the scope of the appended claims.

What is claimed is:

1. A continuously operating ice making apparatus comprising a housing, water supply means connected to said housing for introducing water into the housing, means for cooling said housing to form slush therein, an apertured extrusion plate as part of said housing, pressure means movably supported in said housing for compressing the slush and passing it as ice through the extrusion plate, air vent means arranged relative to said extrusion plate, and liquid heat exchange means located adjacent to said air vent means whereby an ice formation and thus clogging of said air vent means is prevented, said heat exchange means comprising a water circulating circuit including a water space adjacent to said air vent means and at least partially surrounding the surface of said extrusion plate opposite from said pressure means.

2. The apparatus according to claim 1, wherein said water circulating circuit further comprises a water ring space at least partially surrounding said extrusion plate, said water ring space having a depth corresponding at least partially to the width or height of said extrusion plate.

3. The apparatus according to claim 1, wherein said water circulating circuit further includes a heat exchange water space having a water inlet and a water outlet, and means connecting said water outlet to said water supply means.

4. The apparatus according to claim 1, wherein said water circulating circuit further includes a water space and a water supply conduit for said water space, as well as float controlled valve means in said water supply conduit.

5. The apparatus according to claim 1, wherein said extrusion plate has a central bore, said pressure means comprising a screw type extruder having an axle extending with its upper axle end through said central bore of the extrusion plate, said central bore of the extrusion plate having a diameter large enough to provide a ring gap between said upper axle end and said extrusion plate, said ring gap forming said air vent means.

6. The apparatus according to claim 1, wherein said heat exchange means further comprises conduit means connecting said water circulating space to said housing for supplying cooled down water from said space into said housing at its lower end.

7. A continuously operating ice making apparatus comprising a housing, water supply means connected to said housing for introducing water into the housing, means for cooling said housing to form slush therein, an apertured extrusion plate as part of said housing, pressure means movably supported in said housing for compressing the slush and passing it as ice through the extrusion plate, air vent means arranged relative to said extrusion plate, and liquid heat exchanged means located adjacent to said air vent means whereby an ice formation and thus clogging of said air vent means is prevented, said heat exchange means comprising a water circulating circuit including a heat exchange water space having a water inlet and a water outlet, said water circulating circuit further comprising a water container, means connecting said water outlet to said water container, float means in said water container, said water supply means comprising a valve and conduit means connected to said water space for supplying water to said water space, and means operatively connecting said valve to said float means whereby the water supply to the water circulating circuit is controlled by said float means in response to the water level in said water space and in said water container.

8. A continuously operating ice making apparatus comprising a housing, water supply means connected to said housing for introducing water into the housing, means for cooling said housing to form slush therein, an apertured extrusion plate as part of said housing, pressure means movably supported in said housing for compressing the slush and passing it as ice through the extrusion plate, air vent means arranged relative to said extrusion plate, and liquid heat exchange means located adjacent to said air vent means whereby an ice formation and thus clogging of said air vent means is prevented, said heat exchange means comprising a water circulating circuit including a water ring space surrounding said extrusion plate, said ring space having an open top and a sufficient depth so that the water in said ring space covers said extrusion plate, said pressure means comprising a screw type extruder having an axle extending with its upper axle end through said extrusion plate and upwardly through said ring space whereby the water in said ring space covers said upper axle end at least partially.

9. The apparatus according to claim 6, wherein said upper axle end comprises an axially extending bore, and means providing a flow connection between said axially extending bore and said ring space, said apparatus further comprising a water supply conduit extending into said axial bore.

10. The apparatus according to claim 9, wherein said axially extending bore has a closed lower end, and a given inner diameter, said apparatus further comprising a water supply conduit extending into said axial bore, said water supply conduit having a lower open end located close to but spaced from the lower end of said axial bore, said conduit having a smaller outer diameter than said given diameter.

11. The apparatus according to claim 9, wherein said extrusion plate comprises a centrally located ring channel surrounding said upper axle end, said flow connection means interconnecting said axial bore and said ring channel.

* * * * *